Figure 1:
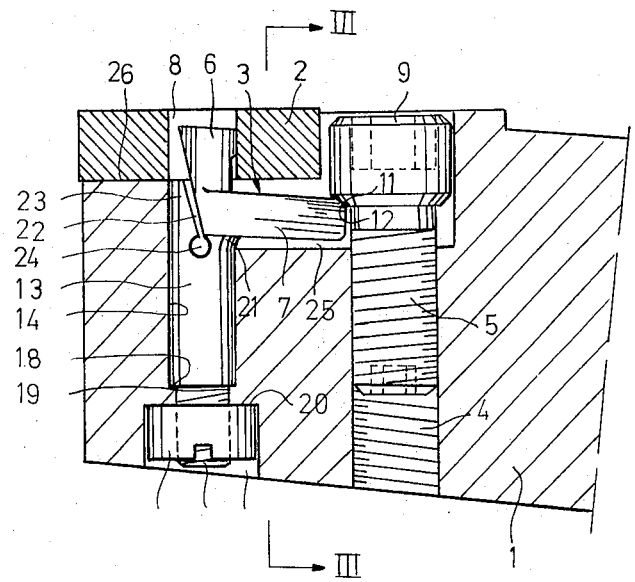

United States Patent [19]
Mihic

[11] 3,792,516
[45] Feb. 19, 1974

[54] DEVICE IN TOOL HOLDERS

[76] Inventor: Wlajko Mihic, Tegnervagen 9, Gavle, Sweden

[22] Filed: May 16, 1972

[21] Appl. No.: 253,835

[30] Foreign Application Priority Data
May 26, 1971 Sweden.............................. 6787/71
Apr. 18, 1972 Sweden.............................. 4982/71

[52] U.S. Cl. .................................................. 29/96
[51] Int. Cl............................................. B26d 1/00
[58] Field of Search ......................................... 29/96

[56] References Cited
UNITED STATES PATENTS
3,289,272 12/1966 Stier........................................ 29/96
3,314,126 4/1967 Stier........................................ 29/96

Primary Examiner—Leonidas Vlachos
Attorney, Agent, or Firm—Diller, Brown, Ramik & Wight

[57] ABSTRACT

This disclosure relates to a toolholder for mounting a detachable insert of the indexable type. The tool holder utilizes a member having an arm which is engaged by a holddown member to urge the clamping member into an insert clamping position wherein the insert is clamped in a preformed socket.

20 Claims, 12 Drawing Figures

DEVICE IN TOOL HOLDERS

The present invention is related to a device in toolholders having at least one detachable insert, for example of the indexable insert type which is, by one arm of a preferably angulated lever, pressible into abutment against a shoulder in a seat provided for the insert in the body of the toolholder on actuation by the second arm of the lever.

Toolholders according to prior art of the construction related above are subject to troublesome disadvantages, in that the insert may be seriously displaced out of an intended position, if it is not surrounded by insert positioning portions of the toolholder body. This involves among other things the disadvantage that the insert is to be dimensioned and designed with a rather great exactitude with respect to the dimension and form of the seat, something involving expenses. If no secure guiding of the insert is provided by such surrounding portions of the body, the correct positioning and maintenance in the correct position will be jeopardized under the action of the considerable forces arising on the insert in e.g., turning.

Object of the present invention is to remove these disadvantages and to create an economical but sturdy toolholder to which a very accurate positioning of the insert is secured even during the most stressing conditions and so without that the insert is necessarily required to be surrounded by any guiding portions of the toolholder body. Thus the invention aims at making an embodiment possible wherein one single shoulder solely is provided on the body and wherein the insert will thus be to an extreme extent unobstructed and easy to adjust for an attack on the workpiece.

The characteristics of the invention will more particularly appear by the appendent claims.

A detailed description of a number of embodiments of the inventions cited as examples is given below with reference to the appended drawings.

Figure 2:
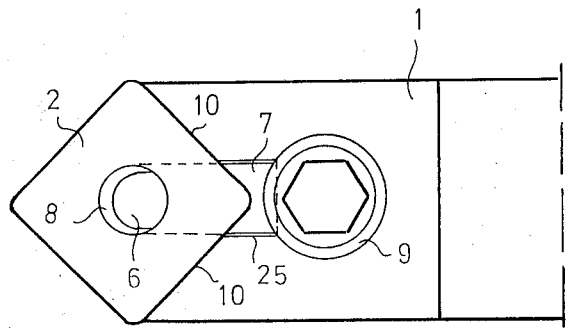
Figure 3:
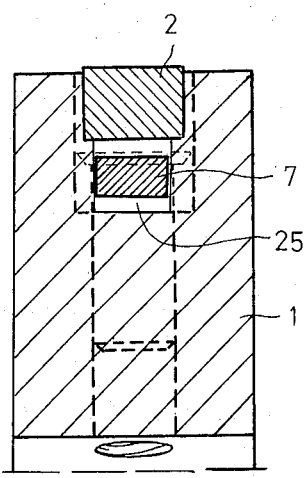

In the drawings:

FIG. 1 is a partially cut longitudinal cross section through a toolholder according to a first embodiment of the invention, FIG. 2 is a plan view from above of the toolholder portion shown in FIG. 1, and FIG. 3 a cross section III—III in FIG. 1.

Figure 4:
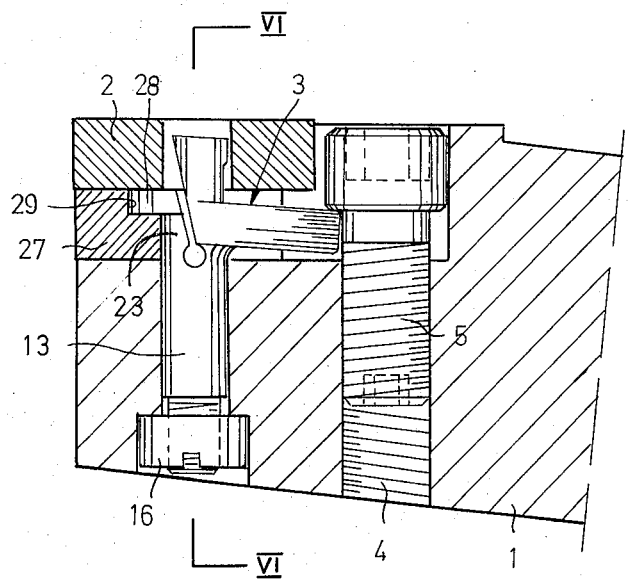
Figure 5:
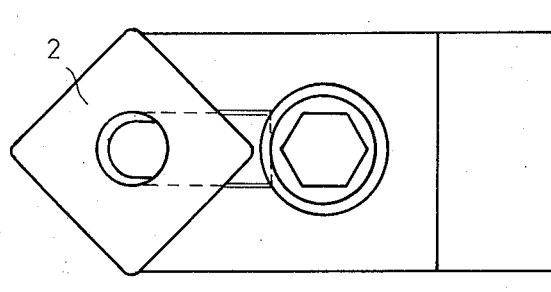
Figure 6:
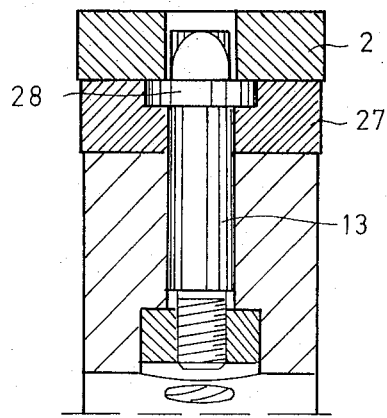
Figure 7:
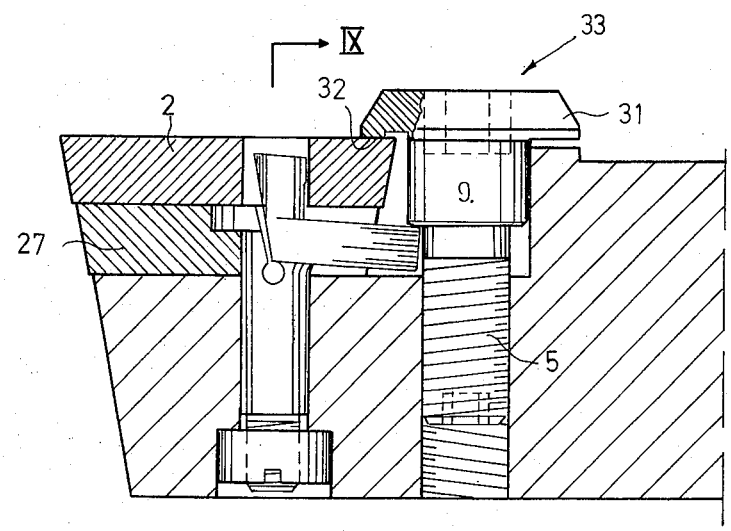
Figure 8:
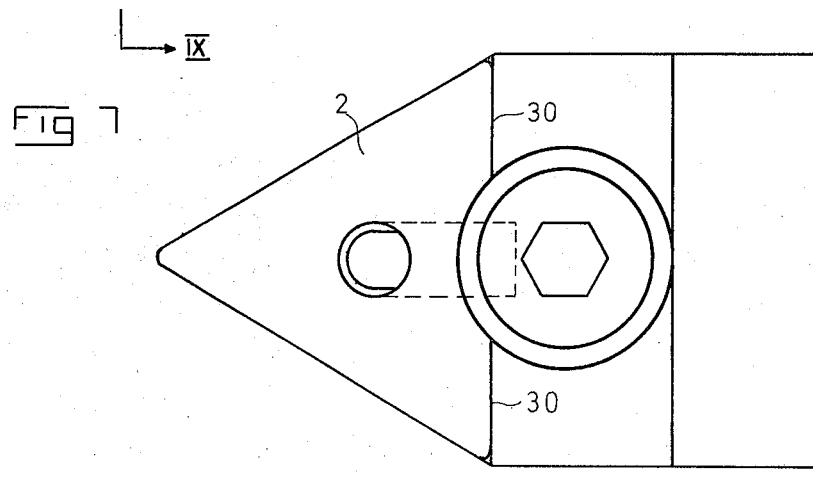
Figure 9:
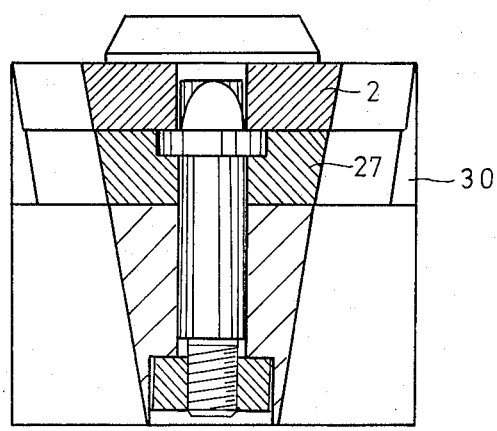

In an analogous manner FIGS. 4 – 6 show a second, FIGS. 7 – 9 a third, and

Figure 10:
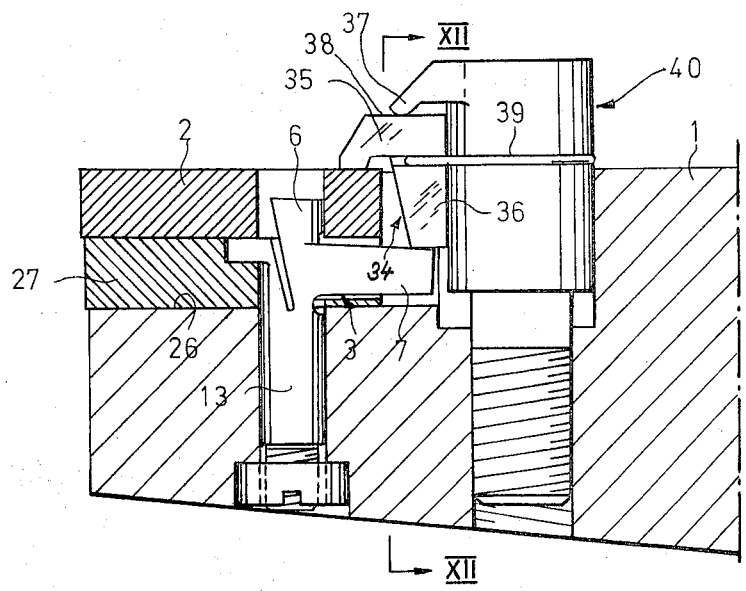
Figure 11:
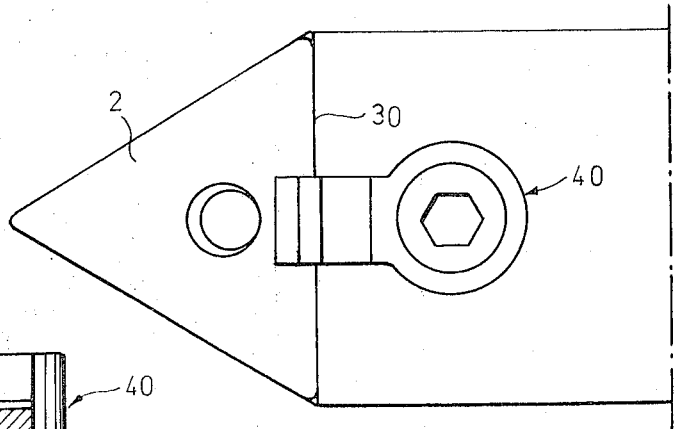
Figure 12:
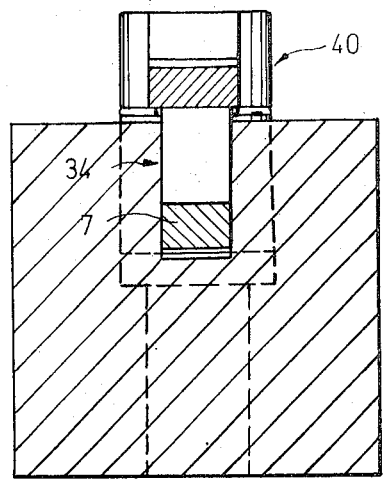

FIGS. 10 – 12 a fourth embodiment of the invention.

In the drawings corresponding or similar parts are designated by the same reference characters.

Reference is first made to FIGS. 1 – 3 illustrating a toolholder which includes in a manner known per se a body 1, an insert 2, a lever in general designated by 3 and a screw 5 screwable into a threaded bore 4 in the body. Said lever 3 is in this case angulated and comprised of two joint parts 6 and 7, in fact a first arm 6 projecting into a suitably central bore 8 of the insert 2 and a second arm 7 which at its outer end abuts against the under-side of a head 9 of the screw 5. In a conventional manner the first joint arm 6 of the lever is, by screwing of the screw 5 into the threaded bore 4 and the concomitant movement of the second arm 7, pressible against the wall of the insert bore 8 to thereby in turn press the insert 2 firmly against a shoulder, or, more precisely, in this case two shoulder faces 10 of a seat in the body 1. The screw 5 may with advantage consist of an internal hexagon screw and the head thereof may for example have a conical lower portion 11 matching a tilted surface 12 at the outer end of the second arm 7. The insert 2 may be but is not necessarily required to be an indexable insert.

According to the principle of the invention the lever 3 has an extension which positions the same in a correct lever or pivoting position, which extension is in engagement with and substantially immovably fixable in relation to a corresponding portion of the body 1. In the embodiment shown in FIGS. 1 – 3 the extension of the lever has the character of a pin 13 while said corresponding portion consists of a recess or bore 14 made in the body and the cross sectional form of which substantially corresponds to the cross sectional form of the pin.

The bore 14 is most suitably a through-bore and opens out into an enlarged space 15 designed for accomodating a nut 16 which is applied to a threaded end portion 17 of the pin. This threaded portion 17 has as seen a lesser diameter or cross sectional area than the pin 13 in general, an annular stop 18 being formed on the pin which abuts against a corresponding likewise annular stop 19 extending into the bore 14. It is obvious that when the nut 16 is tightened against the bottom 20 of the space 15 the pin 13 will be positioned or fixed in a predetermined position with the stop 18 against the stop 19. This implies in turn that the lever 3 connected to the pin will be positioned in a position in which the joint arms 6 and 7 take up the correct positions relative to the insert 2 and the screw head 9 respectively.

According to the invention the extension or pin 13 is flexibly connected to the lever 3 through a connection piece or portion 21, which in this case has a lesser cross sectional area than the pin proper. The cross sectional area of the connection piece should be at most half, preferably at most a third of the cross sectional area of the pin. This connection piece is in the example illustrated realized by recessing in the pin 13 a slot 22, which defines in one direction the joint arm 6 — which may be an extension of the pin — and in the opposite direction defines a pin portion designated by 23. To make the joint arm 6 of the lever 3 result as sturdy as possible notwithstanding the desired comparably feeble cross sectional area of the connection piece 21 the slot 22 may be made at least somewhat tilted relative to the longitudinal or central axis of the pin 13. In the bottom of the slot 22 a rounded recess 24 is provided and suitably consisting of a bore extending across the pin and which removes the risk of rupture or crack formation at the slit bottom when the lever 3 bends or moves. In consequence of the fact that the cross bore 24 extends diametrically through the pin 13 the connection piece will obtain a greater longitudinal extension across the movement plane of the lever (or parallel to the bore 24) than parallel to the movement plane of the lever. More particularly the longitudinal extension of the connection piece parallel to the bore 24 is at least as much as double the longitudinal extension at right angles thereto to become relatively greater the farther to the side in a direction toward the screw 5 the bore 24 will be disposed. This feature the connection piece or zone 21 is elongate in a direction parallel to the bore 24 leads to the advantage that the lever 3 can pivot or move rather easily in its intended movement plane at right angles to the longitudinal direction of the bore, but only with difficulty in a plane at right angles thereto, for the inertia moment in the lastmentioned plane will be many times greater than the inertia moment in the first-mentioned plane.

It appears by the figures that the second joint arm 7 of the lever is movable in space 25 disposed below or inside the seat face 26 against which the insert 2 abuts.

The device described operates in the following manner. When the insert 2 is to be clamped the pin 13 is first applied (if not already done) and the lever 3 associated thereto with the pin 13 is inserted and secured in the bore 14 by means of the nut 16. The screw 5 is applied provisionally in the threaded bore 4 and the insert 2 is disposed so as to make the joint arm 6 project into the central bore 8 of the insert. Then the screw 5 is screwed downward in the threaded bore 4, the head 9 pressing down the joint arm 7 of the lever 3. The connection zone 21 being comparably bendable or flexible all of the inherently stiff or rigid lever can pivot to make the joint arm 6 press the insert 2 into abutment against the shoulder or shoulder faces 10. The insert will then be firmly retained primarily due to the pressing of the insert against the shoulder but also due to the connection of the lever with the pin 13, whereby it is secured that the insert will move across the pivoting plane of the lever. In this connection the fit of the insert relative to the shoulders 10 is not required to be as precise as previously.

When the insert is to be removed or indexed the screw 5 is released in the usual manner.

The embodiment of the invention illustrated in FIGS. 4 – 6 is modified in relation to the embodiment shown in FIGS. 1 – 3 insofar as the insert 2 here abuts against a shim 27, which among other things provides for that the space in the body 1 required for the lever is more easily made. To retain this shim a projecting flange 28 is formed in the pin portion 23 and provided to be accomodated in a niche 29 in the support plate. It is to be noted that the stop ring 19 shown in FIG. 1 is absent in the present embodiment. In such manner the flange 28 can clamp and lock the shim on tightening of the nut 16.

Now reference is made to FIGS. 7 – 9 which illustrate a third embodiment of the invention. In this embodiment only one single straight shoulder surface 30 for the insert 2 is provided in the body 1. By the lever 3 having in accordance with the principle of the invention the anchor extension or pin 13 the insert 2 will be firmly retained at the body, something that was impossible previously. In this embodiment the insert 2 is extremely unobstructed and can thus easily get access to the work.

The screw or the clamping means 33 provided to actuate the lever 3 in the embodiment example shown in FIGS. 7 – 9 has suitably an annular projection or roof 31 having a plane underside 32. This projection 31 cooperates in retaining the insert 2 together with the lever 3, something that may be of advantage when inserts having a positive rake or inserts subject to exceptionally great stresses are involved.

Characterizing for the embodiment shown in FIGS. 10 – 12 is that it includes a clamping means 40 adapted to transmit clamping forces to the insert as well as to the second arm 7 of the lever 3 through a scale beam like transmission member which is tiltable or pivotable to secure a simultaneous force transmission to the insert and said arm.

The provision of said transmission member assures that the clamping force emanating from the clamping means will be distributed to the lever as well as the upper side of the insert, the member abutting simultaneously against both of these locations and by its tiltability or pivotability balancing or distributing the clamping force to the locations in question in the manner of a scale beam.

In the embodiment shown the seat is recessed in the body 1 which is defined on the one hand by a bottom designated by 26 and on the other by a wall 30 serving as a shoulder for the insert. Though the shoulder 30 consists in this case precisely of one single, vertical wall against which the insert is pressible, the shoulder in question may be formed in many other ways, e.g., be comprised of a plurality of projections providing substantially a point or line abutment against the insert.

In accordance with the principle of the invention the clamping means 40 is adapted to transmit clamping forces to the insert 2 as well as to the second arm 7 of the lever through a separate, scale beam like transmission member 34 which is tiltable or pivotable to secure a simultaneous force transmission to the insert 2 and the arm 7.

The transmission member 34 can as shown in FIG. 10 consist of a substantially L-shaped suitably rigid material piece having a first portion 35 transmitting clamping forces directly to the insert and a second portion 36, substantially at right angles to the first portion and transmitting clamping forces to the arm 7. Preferably the portion 36 is adapted to abut against the arm 7 at or adjacent the outer end of the arm.

The clamping force provided by tightening the screw of the clamping means 40 is applied to the transmission member by a projection 37 of the clamping means and in this case formed as a nose. To secure the mobility of the transmission member providing the force distribution to the insert 2 and the arm 7 resp. without the arising of inconvenient tensions or stresses in the contact surface between the nose 37 and the upper side 38 of the transmission member the portion of the nose abutting against said upper side may have a rounded form while the upper side of the transmission member is plane. Inversely, it is also possible to form the nose or projection 37 with a plane abutment surface while the transmission member is formed with a contact portion with a rounded form.

The device described operates in the following manner:

On tightening the screw of the clamping means in order to clamp the insert 2 the projection or nose 37 of the clamping means will abut against the transmission member 34 which in turn abuts against the insert by its first portion or shank 35 and abuts by its second portion of shank 36 against the arm 7. Suppose that the portions 35 and 36 on tightening the clamping means will not both of them immediately abut against the insert and the arm resp., but that e.g., the portion 35 is first applied against the insert 2 before the portion 36 comes into abutment against the arm 7; under such circumstances the transmission member will, on continued tightening of the clamping means, be pivoted clock-wise until the two portions 35 and 36 of the member have obtained both of them a correct abutment against the insert and the arm resp. Thus the true force will be correctly transmitted to the insert and the lever. Continued tightening of the clamping means will cause the insert to be firmly clamped in the seat, on the one hand, by the same being pressed against the shim 27 by the portion 35 of the transmission member, and on the other in that the same is pressed onto the shoulder 30 by the first arm 6 of the lever 3 (said arm 6 evidently being pivoted clock-wise by the second arm 7 actuated by the portion 36 of the transmission member).

It is to be noted that the portion of the nose 37 abutting against the transmission member 34 is disposed in a vertical plane being comparably near to the contact surface between the portion 36 and the arm 7, while the distance between said vertical plane and the contact surface between the portion 35 and the insert 2 is comparably great. Besides the arm 7 is of a many times greater length than the arm 6. This will in practice mean that the force pressing the insert against the shoulder 30 will in this case be considerably greater than the force pressing the insert against the seat bottom 26 or the support 27. If desired it is possible to vary the magnitude of said forces by variation of e.g., the application point of the nose relative to the transmission member, the length of the arm 7 as opposed to the length of the arm 6, and/or the length of the portion 35 of the transmission member.

By the provision of the transmission member according to the invention the lever means 3 may be made completely rigid or stiff, i.e., the two arms 6, 7 may be made approximately immovable relative to each other, whereby an optimal clamping of the insert will be obtained.

As best shown in FIG. 10 the transmission member 34 may be retained at or connected to the clamping means 40 by means of a yoke like locking spring 39 which is more or less yielding to permit a pivoting or tilting of the transmission member.

It is understood that the invention is not limited to the embodiments described and shown in the drawings solely. It is thus for example possible to form the extension 13 of the lever 3 in another manner than as a pin, and instead of by a nut or another threaded member the extension or pin may be fixed relative to the body in many other ways, e.g., by means of insertable cotter like locking elements. Further the lever may be adapted to be actuated by other means than precisely a screw. The form and dimension of the transmission member 34 may rather radically diverge from those shown in the drawing, and besides the same is not necessarily required to be connected to the clamping means. The clamping means may in turn be of a different design than that exemplified and for example have an annular projection as shown in FIGS. 7 – 9 instead of the nose or hook like projection shown in FIGS. 10 – 12. The support 27 shown in the drawings may if desired be disposed of in that the insert may in all of the embodiments abut directly against the seat bottom 26. Also other modifications of the invention are conceivable within the scope of the appendent patent claims.

I claim:

1. A tool holder for replaceable inserts of the type having an opening therein, said tool holder comprising a body having formed therein an insert seat including a shoulder, a recess in said body extending from a central portion of said seat beyond said shoulder, a lever device for clamping an insert against said shoulder; said lever device including a first arm for engaging in an insert opening and applying a force thereon directed towards said shoulder, a second arm connected to said first arm and extending laterally therefrom in said recess, said first and second arms defining a lever, an extension carrying said arms for relative pivotal movement; cooperating means on said extension and said body remote from said seat for maintaining said extension in a substantially immovable selected position relative to said body, and clamping means carried by said body for engaging said second arm and effecting pivoting of said arms relative to extension to effect clamping of an insert against said shoulder.

2. A device according to claim 1 wherein said cooperating means includes an opening in said body and at least a portion of said extension being in the form of a pin fitting said opening.

3. A device according to claim 2, wherein the opening is a through-bore and that the pin has at its end facing away from the lever a threaded portion for receiving a nut to position the pin in the bore.

4. A device according to claim 3, wherein the threaded portion is of a lesser cross sectional area than the pin, a stop in said body at one end of said bore, and stop means on the pin for abutting against the stop in the body fixing the pin in a predetermined position defining the correct engagement of the lever with the insert.

5. A device according to claim 1 wherein the extension is integrally flexibly connected to said lever.

6. A device according to claim 5, wherein the lever is integrally connected with the extension through a connection piece having a lesser cross sectional area than the extension.

7. A device according to claim 6, wherein the cross sectional area of the connection piece is at most a half of the cross sectional area of the pin.

8. A device according to claim 6 wherein the connection piece has a greater length across the movement direction of the lever as parallel to the movement direction of the lever.

9. A device according to claim 6, wherein the first arm of the lever is at least partially formed by a slot in the extension.

10. A device according to claim 9, wherein the slot is tilted relative to a longitudinal axis of the extension.

11. A device according to claim 9, wherein a rounded recess is provided in the bottom of the slot to avoid crack formation and rupture in the pin during the pivoting of the lever.

12. A device according to claim 1 wherein a projecting flange is connected to the extension for securing an insert support plate to the body below an insert.

13. A device according to claim 12, wherein the lever is partially separated from the extension by a slot, and the flange is disposed outermost at the end of the extension facing the insert on a portion of the extension separated from the lever by said slot.

14. A device according to claim 1 wherein the clamping means has means for pressing the insert against the seat to hold the insert in cooperation with the lever.

15. A device according to claim 1 wherein there is a scale beam-like transmission member, and the clamping means is operable to transmit clamping forces to an insert and to the second arm through the scale beam-like transmission member which is tiltable relative to the body to secure a simultaneous force transmission and distribution to the insert and said second arm.

16. A device according to claim 15, wherein the transmission member is substantially L-shaped having a first portion transmitting clamping forces to the insert and second portion transmitting clamping forces to the second arm.

17. A device according to claim 15 wherein the transmission member has a force application surface and the clamping means has an extension abutting said force application surface.

18. A device according to claim 17, wherein the extension of the clamping means is of a rounded form.

19. A device according to claim 15, wherein the transmission member abuts against the second arm generally adjacent to the outer end of said second arm.

20. A device according to claim 15 wherein the transmission member is connected to the clamping means by means of a yoke-like resilient locking spring.

* * * * *